April 8, 1952   L. WECHSLER   2,592,092
NUTATION DAMPING DEVICE
Filed Feb. 11, 1946

- INVENTOR -
LEONARD WECHSLER
BY
- ATTORNEY -

Patented Apr. 8, 1952

2,592,092

UNITED STATES PATENT OFFICE 2,592,092

NUTATION DAMPING DEVICE

Leonard Wechsler, South Bend, Ind., assignor to Bendix Aviation Corporation, Teterboro, N. J., a corporation of Delaware Application February 11, 1946, Serial No. 646,777

11 Claims. (Cl. 74—5.5)

This invention relates to a nutation damping device for a gyroscope of the type used for indicating the true vertical.

An object of my present invention is to provide a novel nutation damping device for a gyro-vertical to dampen the oscillations of the gyroscope about its position of equilibrium.

Another object of my invention is to provide for a gyro-vertical having an erecting system with a nutation damping device in which an auxiliary weight or mass is mounted coaxially with the gyroscope spin axis.

A further object of this invention is to provide a gyro-vertical having an erecting system with a nutation damping mechanism in which an auxiliary weight or mass is provided, free to oscillate within narrow limits about an axis coaxial with the spin axis of the gyroscope, and in a plane normal thereto.

Still another object of the invention is to provide a nutation damping device of the character described in which the oscillations of the auxiliary mass or weight due to the nutation of the gyroscope, are damped.

Still a further object of my invention is to provide a nutation damping device of the character described which shall aid in the erecting of the gyroscope only when the tilt of the spin axis is greater than 15° from its normal vertical position.

Yet another object of this invention is to provide a novel and compact nutation damping device of the character described which shall consist of relatively few and simple parts, which shall be inexpensive to manufacture, easily installed on existing gyro-verticals, which shall have a large variety of applications, and yet be practical and efficient to a high degree in use.

Other objects of this invention will in part be obvious, and in part hereinafter pointed out.

The invention accordingly consists in the features of construction, combination of elements and arrangement of parts which will be exemplified in the construction hereinafter described, and of which the scope of application will be indicated in the appended claims.

Figure 1:
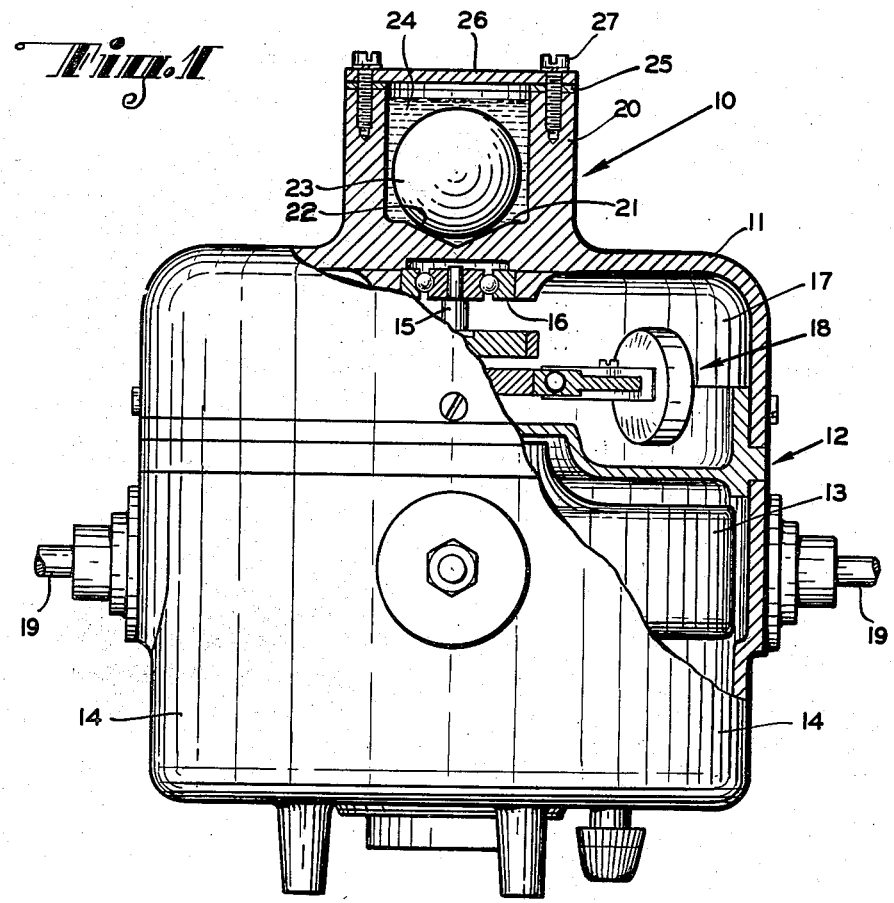
Figure 2:
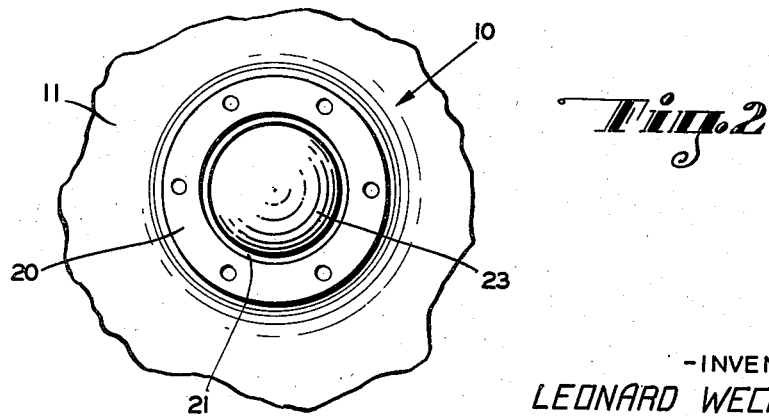

In the accompanying drawings, in which one of the various possible illustrative embodiments of this invention is shown, Figure 1 is an elevational view of a gyro-vertical, portions of which have been broken away and portions shown in cross-section to illustrate my novel nutation damping device, while Figure 2 is a top view of the nutation damping device with the cover removed.

I accomplish the several objects of this invention by providing a cylindrical or cup member fixed to, or integral with, the top of a gyroscope casing, the axis of the cup being coaxial with the spin axis of the gyroscope. The bottom of the cup is formed with a small conical depression also coaxial with the spin axis. Resting in the conical depression is a ball, preferably made of steel, the diameter of which is slightly less than the inside diameter of the cup. The cup may be filled with a fluid to dampen the oscillations of the ball.

As long as the rotor axis of the gyroscope remains in its normal vertical position, the ball will remain in the conical depression of the cup. When the spin axis of the rotor departs from its normal vertical position due to extraneous forces, the erecting system usually provided in gyro-verticals will tend to return the spin axis to its normal position. Since the torque applied to the gyroscope by the erecting system reacts with the gyroscopic resistance, the return of the spin axis to vertical is never a linear function. The end of the spin axis moves through a series of spiral loops of decreasing diameter until a point is reached when the path made by the end of the spin axis is a cycloidal loop.

The nutation of the gyroscope axis will be transmitted to the ball within the cup. As a result of these oscillations, the ball will ride up the side of the conical depression and oscillate at a frequency equal and opposite to that of the spin axis, tending to damp out the nutation.

Referring now in detail to the drawings, 10 designates a nutation damping device embodying the invention, shown integral with a cover 11 of a gyro-vertical 12.

The gyro-vertical comprises a rotor 13 within a casing 14 fixed to, or made integral with, a shaft 15 and adapted for spinning about a vertical axis. The upper end of the shaft 15 is journaled in a bearing 16 fixed in the cover 11, while the lower end of the shaft is journaled in a similar bearing (not shown) fixed within the lower part of the casing 14. Fixed to the rotor shaft 15 and within an enclosure 17 formed by the cover 11, is a gyro erecting system indicated generally as at 18, said erecting system being more fully shown and described in U. S. Patent No. 2,159,118, issued May 23, 1939 to Robert Alkan.

The gyro rotor 13 may be driven in any suitable manner known in the art. The casing 14 is mounted in a gimbal ring (not shown) for angular movement about a horizontal axis formed by the pivots 19. The gimbal ring in turn is also pivoted (not shown) for angular movement about a horizontal axis normal to the axis of the pivots 19.

Integral with the cover 11 is a cylindrical member 20 to form a cup having a bottom wall 21, the axis of said member being coaxial with the shaft 15. Formed in the center of the bottom wall 21 is a conical depression 22. Resting in the depression 22 is a ball 23 of slightly less diameter than the diameter of the cylindrical member 20. The space surrounding the ball 23 is preferably filled with a damping fluid indicated as at 24, the fluid filling the cup to a level a little below the top edge of member 20, to permit expansion thereof. A sealing gasket 25 and cover 26 is fixed to the top of member 20 as by screws 27, to seal the interior of the cup.

In operation, the nutation of the gyro spin axis will cause the ball 23 to ride out of the conical depression 22. The ball will then oscillate within the limited confines of the cup at a frequency which will tend to dampen the spin axis nutation. Due to its limited space within the cup, the ball 23 will not affect the erecting system 18 provided the precessional force applied does not tilt the spin axis more than 15° from normal. When the tilt of the gyroscope axis is more than 15° from its normal vertical position, the ball 23 will ride out of the depression 22 to abut the wall of the cup. The impact of the ball, although small, will impart torque in addition to that applied by the erecting system, tending to aid the erecting system in returning the spin axis to its vertical position.

It will thus be seen that there is provided a nutation damping device in which the several objects of this invention are achieved, and which is well adapted to meet the conditions of practical use.

As various possible embodiments might be made of the above invention, and as various changes might be made in the embodiment herein described, it is to be understood that all matter herein set forth, or shown in the accompanying drawings, is to be interpreted as illustrative and not in a limiting sense.

Having thus described my invention, I claim as new, and desire to secure by Letters Patent:

1. The combination comprising a casing, a gyroscope rotor within said casing spinning about a vertical axis, means for mounting said casing for angular movement about mutual perpendicular horizontal axes normal to the rotor spin axis, an enclosure carried by said casing coaxial with the rotor spin axis, a mass within said enclosure free to oscillate about an axis coaxial with said spin axis, and fluid means within said enclosure surrounding said mass for damping the oscillations thereof.

2. The combination comprising a casing, a gyroscope rotor spinning about a vertical axis within said casing, means for mounting said casing for angular movement about mutually perpendicular horizontal axes normal to the rotor spin axis, an erecting system for said rotor, a cylindrical cup carried by said casing coaxial with the spin axis and above said rotor, a depression in the center of the bottom wall of said cup, and a rolling mass normally within said depression free to oscillate within said cup.

3. The combination comprising a casing, a gyroscope rotor spinning about a vertical axis within said casing, means for mounting said casing for angular movement about mutually perpendicular horizontal axes normal to the rotor spin axis, an erecting system for said rotor, a cylindrical cup carried by said casing coaxial with the spin axis and above said rotor, a depression in the center of the bottom wall of said cup, a rolling mass normally within said depression free to oscillate within said cup, and fluid means within said cup surrounding said mass for damping the oscillations of said mass.

4. The combination comprising, a casing, a gyroscope rotor spinning about a vertical axis within said casing, means for mounting said casing for angular movement about mutual perpendicular horizontal axes normal to the rotor spin axis, an erecting system for said rotor, a cylindrical cup carried by said casing coaxial with the spin axis and above said rotor, a depression in the center of the bottom wall of said cup, a rolling mass normally within said depression and free to oscillate within said cup, said mass being adapted to ride out of said depression upon a tilt of more than 15° of the rotor spin axis.

5. The combination comprising, a casing, a gyroscope rotor spinning about a vertical axis within said casing, means for mounting said casing for angular movement about mutual perpendicular horizontal axes normal to the rotor spin axis, an erecting system for said rotor, a cylindrical cup carried by said casing coaxial with the spin axis and above said rotor, a depression in the center of the bottom wall of said cup, a rolling mass normally within said depression and free to oscillate within said cup, said mass being adapted to ride out of said depression upon a tilt of more than 15° of the rotor spin axis, and fluid means within said cup for damping the oscillations of said mass.

6. In a gyroscope, a rotor spinning about an axis adapted to maintain a predetermined attitude, means mounting said rotor for angular movement about mutually perpendicular axes at an angle to the spin axis, an enclosure carried by said means and having a bottom wall with a depression therein, and a rigid rolling mass received in said depression and oscillating in said enclosure in response to nutation forces and arranged to damp nutation of the rotor spin axis.

7. In a gyroscope, a rotor spinning about an axis adapted to maintain a predetermined attitude, means mounting said rotor for angular movement about mutually perpendicular axes at an angle to the spin axis, an erecting system to maintain the spin axis in said predetermined attitude, and spherical mass oscillating in a depression in said means in response to nutation forces and arranged to damp nutation of the rotor spin axis.

8. In a gyroscope, a rotor spinning about an axis adapted to maintain a predetermined attitude, means mounting said rotor for angular movement about mutually perpendicular axes at an angle to the spin axis, a rigid mass oscillating in response to nutation forces to damp nutation of the rotor spin axis, and fluid means damping vibrations of said mass.

9. In a gyroscope, a casing, a rotor mounted in said casing and spinning about an axis adapted to maintain a predetermined attitude, means for mounting said casing for angular movement about mutually perpendicular axes at an angle to the spin axis, an enclosure carried by said casing, a mass within said enclosure oscillating in response to nutation forces to damp nutation of the rotor spin axis, and fluid means within said enclosure surrounding said mass and damping vibrations thereof.

10. In a gyroscope, a rotor spinning about an axis adapted to maintain a predetermined attitude, means mounting said rotor for angular movement about mutually perpendicular axes at an angle to the spin axis, an erecting system to maintain the rotor spin axis in said predetermined attitude, an auxiliary rigid mass oscillating in response to nutation forces and arranged to damp nutation of the gyroscope, and means for restricting movement of said mass so that said mass aids said erecting system to erect the rotor spin axis to said predetermined attitude when the spin axis tilts more than 15° therefrom.

11. In a gyroscope, a rotor spinning about an axis adapted to maintain a predetermined attitude, means mounting said rotor for angular movement about mutually perpendicular axes at an angle to the spin axis, and a rolling mass oscillating in a depression in said means in response to nutation forces and arranged to damp nutation of the rotor spin axis.

LEONARD WECHSLER.

REFERENCES CITED

The following references are of record in the file of this patent:

UNITED STATES PATENTS

| Number | Name | Date |
|---|---|---|
| 1,141,099 | Anschutz-Kaempfe | June 1, 1915 |
| 1,324,482 | Titterington | Dec. 9, 1919 |
| 1,773,412 | Thompson | Aug. 19, 1930 |
| 1,988,591 | Gillmor | Jan. 22, 1935 |
| 2,133,489 | Smith | Oct. 18, 1938 |
| 2,292,989 | Carter | Aug. 11, 1942 |
| 2,380,538 | Meredith | July 31, 1945 |
| 2,411,550 | Lynn et al. | Nov. 26, 1946 |